(12) United States Patent
Qiu et al.

(10) Patent No.: US 9,566,459 B2
(45) Date of Patent: Feb. 14, 2017

(54) FIRE ENGINE SUITABLE FOR FIRE-FIGHTING IN HIGH-RISE AND SUPER HIGH-RISE BUILDINGS

(71) Applicant: BEIJING MECHANICAL EQUIPMENT INSTITUTE, Beijing (CN)

(72) Inventors: Xuyang Qiu, Beijing (CN); Yan Shen, Beijing (CN); Shuyong Han, Beijing (CN); Hao Liu, Beijing (CN); Yuan Qin, Beijing (CN); Xuewen Zhang, Beijing (CN)

(73) Assignee: Beijing Mechanical Equipment Institute, Beijing (CN)

( * ) Notice: Subject to any disclaimer, the term of this patent is extended or adjusted under 35 U.S.C. 154(b) by 0 days.

(21) Appl. No.: 14/905,665

(22) PCT Filed: Jul. 16, 2013

(86) PCT No.: PCT/CN2013/079451
§ 371 (c)(1),
(2) Date: Jan. 15, 2016

(87) PCT Pub. No.: WO2015/006915
PCT Pub. Date: Jan. 22, 2015

(65) Prior Publication Data
US 2016/0166862 A1    Jun. 16, 2016

(51) Int. Cl.
*A62C 27/00* (2006.01)
*A62C 3/02* (2006.01)
(Continued)

(52) U.S. Cl.
CPC ............... *A62C 3/025* (2013.01); *A01G 25/16* (2013.01); *A62C 3/00* (2013.01); *A62C 8/005* (2013.01);
(Continued)

(58) Field of Classification Search
CPC ........... A62C 3/025; A62C 27/00; A62C 3/00; A62C 37/00; A62C 8/005; G01S 17/08; G01S 17/88; A01G 25/16; B05B 12/00; E02F 9/2025; F42B 12/50
(Continued)

(56) References Cited

U.S. PATENT DOCUMENTS

| | | | | | |
|---|---|---|---|---|---|
| 3,989,109 | A | * | 11/1976 | Gagliardo | A62C 31/02 169/24 |
| 4,678,041 | A | * | 7/1987 | Staudinger | A62C 27/00 169/24 |

(Continued)

*Primary Examiner* — Steven J Ganey
(74) *Attorney, Agent, or Firm* — Calfee, Halter & Griswold LLP

(57) ABSTRACT

The invention discloses a fire fighting truck applicable to high-rise and super high-rise building fire suppression, comprising a truck chassis (1), a command control equipment (2), an launch control equipment (3), an equipment compartment (4), an launching apparatus (5), an ejection device (6), a fire extinguishing bomb (7), a turret control apparatus (8) and a photoelectric detection equipment (9), wherein, the command control equipment (2) and the launch control equipment (3) are arranged in the co-pilot position of the cab of the truck chassis (1); the equipment compartment (4) is arranged behind the cab and is fixed on the truck chassis (1) with bolts; the launching apparatus (5) is arranged on the truck chassis (1) and is fixed with screws; the ejection device (6) is arranged and fixed on the launching apparatus (5); the fire extinguishing bomb (7) is arranged within the ejection device (6); the turret control apparatus (8) is distributed on the truck chassis and the launching apparatus for accomplishing the actions of leveling the truck body and controlling the launching apparatus.

10 Claims, 8 Drawing Sheets

(51) Int. Cl.
- *A62C 8/00* (2006.01)
- *A62C 3/00* (2006.01)
- *G01S 17/88* (2006.01)
- *G01S 17/08* (2006.01)
- *A01G 25/16* (2006.01)
- *B05B 12/00* (2006.01)
- *E02F 9/20* (2006.01)
- *F42B 12/50* (2006.01)
- *A62C 37/00* (2006.01)

(52) U.S. Cl.
CPC ............... *A62C 27/00* (2013.01); *A62C 37/00* (2013.01); *B05B 12/00* (2013.01); *E02F 9/2025* (2013.01); *F42B 12/50* (2013.01); *G01S 17/08* (2013.01); *G01S 17/88* (2013.01)

(58) Field of Classification Search
USPC ............ 169/24, 35, 36, 52, 56; 239/69, 159; 701/1, 50; 102/370
See application file for complete search history.

(56) References Cited

U.S. PATENT DOCUMENTS

| | | | |
|---|---|---|---|
| 6,922,615 B2 * | 7/2005 | Pillar | A62C 27/00 169/24 |
| 7,107,129 B2 * | 9/2006 | Rowe | A62C 27/00 169/24 |

* cited by examiner

FIRE ENGINE SUITABLE FOR FIRE-FIGHTING IN HIGH-RISE AND SUPER HIGH-RISE BUILDINGS

CROSS-REFERENCE TO RELATED APPLICATION

This application is the U.S. national phase entry of PCT/CN2013/079451, with an international filing date of 16 Jul. 2013, the entire disclosure of which is fully incorporated herein by reference.

TECHNICAL FIELD

The present invention relates to fire fighting field, and specifically relates to a fire fighting truck applicable to high-rise and super high-rise building fire suppression.

BACKGROUND ART

The fire suppression of high-rise building whose height is greater than 10 floors or greater than 24 meters and super high-rise building whose height is greater than 100 meters always is a difficult problem in fire-fighting field. The existing fire-fighting equipment at home and abroad is difficult to meet the demand of fire suppression for high-rise especially for super high-rise building because of the limited fire extinguishing height, difficult motor-driven deployment, and high price.

The elevating fire truck and aerial ladder fire truck are typically adopted for high-rise and super high-rise building fire suppression, at present, the highest fire fighting truck in the world is the Bronto fighting truck in Finland, comprising: a truck chassis, a lifting device, and an electrical system. This fire fighting truck lifting height is 101 meters, and water is relayed by low, medium and high area, but the highest water carrying height is only about 160 meters. This fire fighting truck cannot be rapidly deployed in lots of built-up areas and narrow streets as its width is about 8 meters, vehicle length is 17.13 meters, ride height is 4 meters, and gross mass is 60.2 tons under working deployed condition. In addition, this fire fighting truck that import price is up to 22 million yuan cannot be afforded by fire departments in most of the domestic cities, but only equipped by a few cities such as Beijing, Shanghai, and Hangzhou at present.

The high-rise building fire extinguishing system, which is developed in view of the severe situation of high-rise and super high-rise building fire extinguishing in urban environment, is a special type fire extinguishing system that can be motor-driven deployed rapidly at common road surface in urban environment and used to efficiently extinguish and suppress large-area high-rise and super high-rise building fire, which adopts the mode of throwing fire extinguishing bomb to the fire source target. Overall fire-fighting efficiency of the high-rise building fire extinguishing system is determined by throwing precision of the fire extinguishing bomb.

The accurate trajectory solving mode is not used for the existing fire extinguishing bomb trajectory solving method, fire fighters realize that "blind launching" to specific region according to visual judgment and practical experience, which has the problem that hitting accuracy is not high. In the time of high-rise and super high-rise building fire suppression, in order to complete all-weather close range target detection, part of the fire fighting truck is provided with a target (fire source) detection device, which has shortcomings that view field selection number is few, the ratio cannot be adjusted and magnified according to the size of target, and the infrared and white light images cannot be fused because this device adopts cameras with fixed focus as the sighting telescope.

In addition, in the prior art of fire suppression by adopting fire extinguishing bomb mode, the mode of center booster is typically adopted by the fire extinguishing bomb, which will produce a large amount of high-explosive fragments with certain destructiveness when spraying fire-extinguishing agent, so that this kind of fire extinguishing bombs are applicable to regions away from dense population including forest and oil tank, but is not suitable for fire suppression of high-rise and super high-rise building under urban environment condition.

SUMMARY OF THE INVENTION

The present invention is made by this application inventor considering above-mentioned situations of prior art. The main purpose of the present invention is to provide a fire fighting truck applicable to high-rise and super high-rise building fire suppression, which will solve the problem that the existing fire fighting equipment, with limited fire extinguishing height and difficult motor-driven deployment, is difficult to meet the demand of fire suppression for high-rise and super high-rise building.

According to embodiments of the present invention, a fire fighting truck applicable to high-rise and super high-rise building fire suppression is provided, including a truck chassis (1), a command control equipment (2), a launch control equipment (3), an equipment compartment (4), a launching apparatus (5), an ejection device (6), a fire extinguishing bomb (7), a turret control apparatus (8) and a photoelectric detection equipment (9), Wherein, the command control equipment (2) and the launch control equipment (3) are arranged in the co-pilot position of the cab of the truck chassis (1);

the equipment compartment (4) is arranged behind the cab and fixed on the truck chassis (1) with bolts;

the launching apparatus (5) is arranged on the truck chassis (1) and is fixed with screw nails;

the ejection device (6) is arranged on the launching apparatus (5) and fixed thereon;

the fire extinguishing bomb (7) is arranged within the ejection device (6);

the turret control apparatus (8) is distributed on the truck chassis and the launching apparatus for accomplishing the actions of leveling truck body and controlling the launching apparatus;

the photoelectric detection equipment (9) is arranged below the launching apparatus (5) and fixed with screw nails;

wherein, the photoelectric detection equipment (9) comprises an installing shell, a power supply, a white light zoom camera, an infrared camera, a laser rangefinder and an integrated processing unit;

the white light zoom camera is connected to the installing shell by screw nails, infrared camera is connected to the installing shell by screw nails; the laser rangefinder is connected to the installing shell by screw nails; the power supply interface of the white light zoom camera is connected to the power supply via wires; the power supply interface of the infrared camera is connected to the power supply via wires; the power supply interface of the laser rangefinder is connected to the power supply via wires; the data interface of the white light zoom camera is connected to the integrated processing unit via wires; the data interface of the infrared camera is connected to the integrated processing unit via wires; the data interface of the laser rangefinder is connected to the integrated processing unit via wires.

The embodiments of the invention have the following major advantages: by regulating the fire extinguishing bomb launching pitching angle and launching velocity, and combining trajectory data in ascending stage to calculate firing data (calculating the fire extinguishing bomb launching angle), the high-rise and super high-rise building fire suppression has the advantages of high fire extinguishing height and precision, low cost, and short reaction time, meanwhile adopting general motor chassis has characteristic of rapid motor-driven deployment and is suitable for high-rise and super high-rise building fire suppression at urban environment, which has solved the problem that the ratio cannot be adjusted and magnified according to the size of target, and the infrared and white light images cannot be fused at present stage.

BRIEF DESCRIPTION OF REFERENCE NUMERALS

1: truck chassis; 2: command control equipment; 3: launch control equipment; 4: equipment compartment; 5: launching apparatus; 6: ejection device; 7: fire extinguishing bomb; 8: turret control apparatus; 9: photoelectric detection equipment;

2-1: display control panel; 2-2: information processing machine; 2-3: communication device; 3-1: launch control execution assembly; 3-2: fire extinguishing bomb simulator; 4-1: generating set; 4-2: power supply and distribution cabinet; 4-3: servo control device;

5-1: launching turret; 5-2: launching bracket; 5-3: module assembling frame

7-1: empennage braking section; 7-2: blocking plate; 7-3: igniter; 7-4: shell; 7-5: fairing;

7-6: fuze; 7-7: piston; 7-8: combustion chamber; 7-9: fire extinguishing agent; 7-10: main charge

DETAILED DESCRIPTION OF THE INVENTION

The present invention will be described herein below with reference to the drawings.

Figure 1:
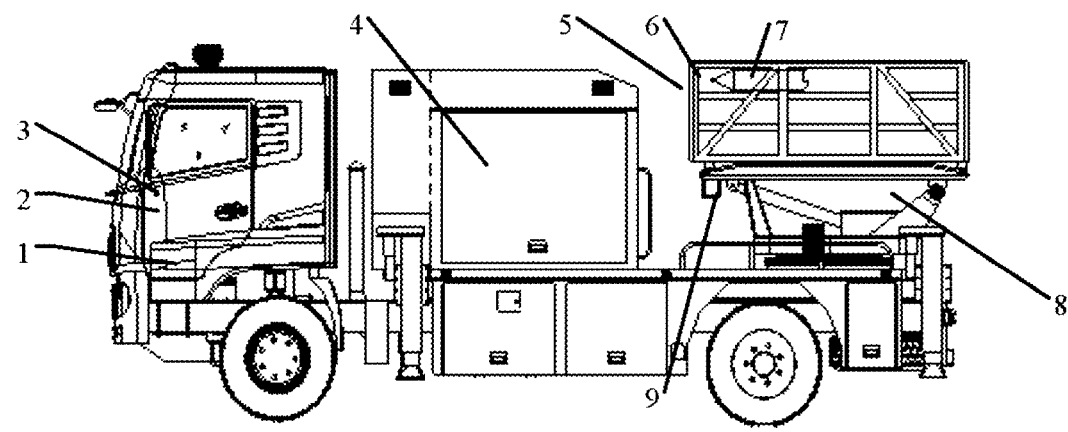
FIG. 1 is a structural schematic diagram of the fire fighting truck applicable to high-rise and super high-rise building fire suppression according to one embodiment of the invention.
Figure 2:
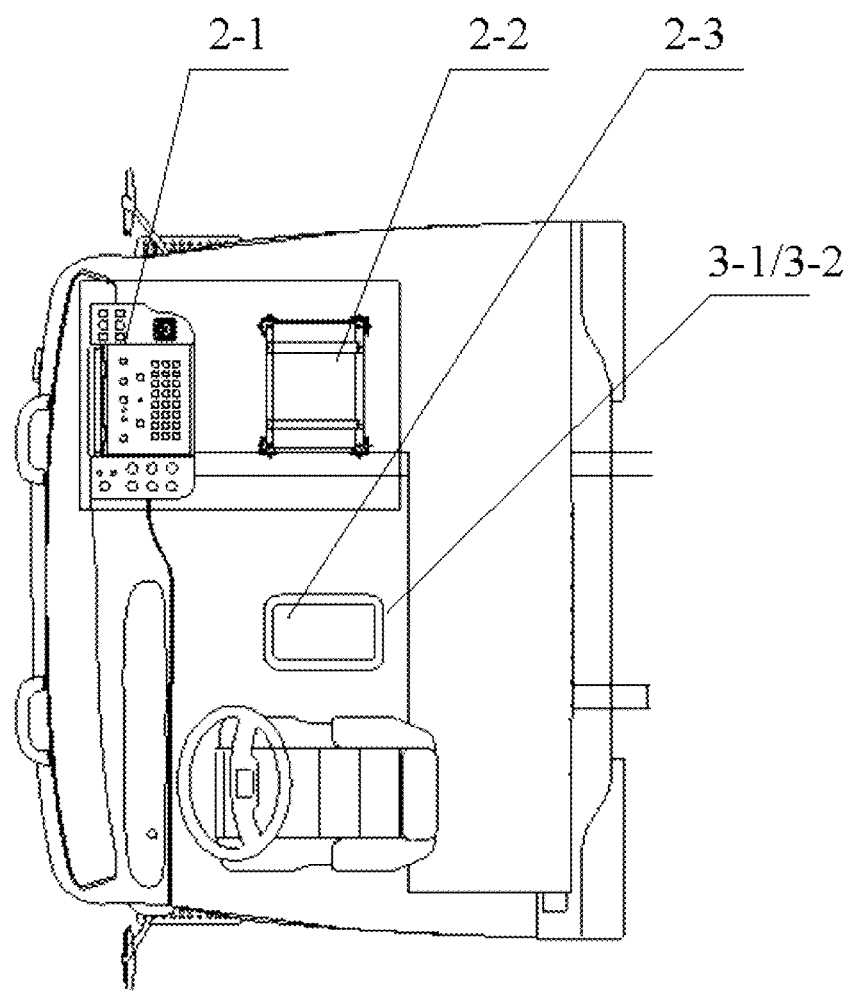
FIG. 2 is a structural schematic diagram of the cab of the fire fighting truck applicable to high-rise and super high-rise building fire suppression according to one embodiment of the invention.
Figure 3:
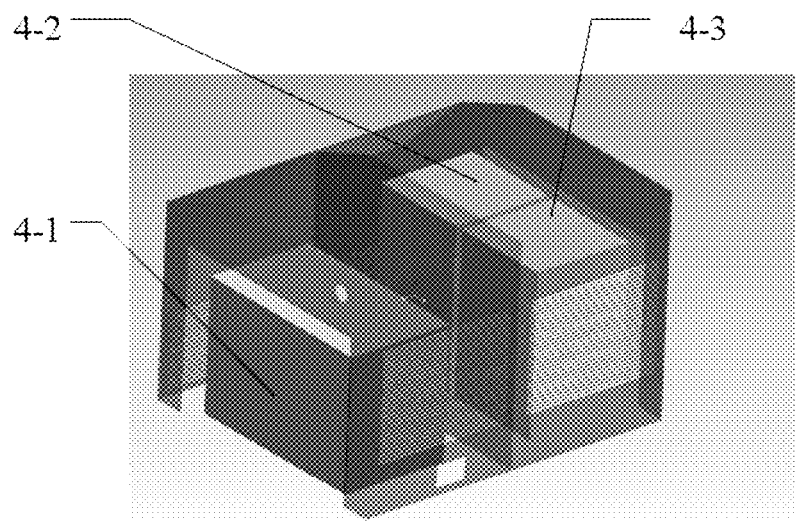
FIG. 3 is a structural schematic diagram of the equipment compartment of the fire fighting truck applicable to high-rise and super high-rise building fire suppression according to one embodiment of the invention.
Figure 4:
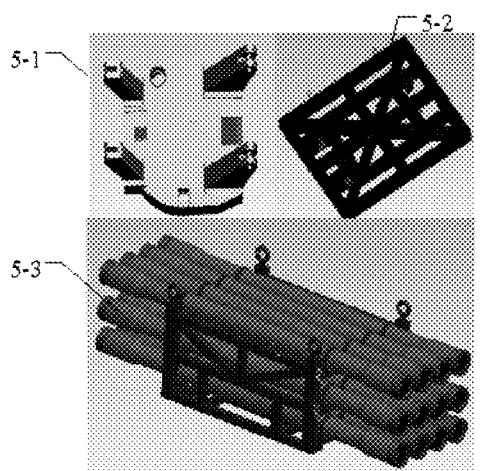
FIG. 4 is a structural schematic diagram of the launch control equipment of the fire fighting truck applicable to high-rise and super high-rise building fire suppression according to one embodiment of the invention.
Figure 5:
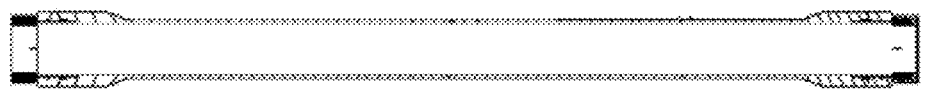
FIG. 5 is a structural schematic diagram of the ejection device of the fire fighting truck applicable to high-rise and super high-rise building fire suppression according to one embodiment of the invention.
Figure 6:
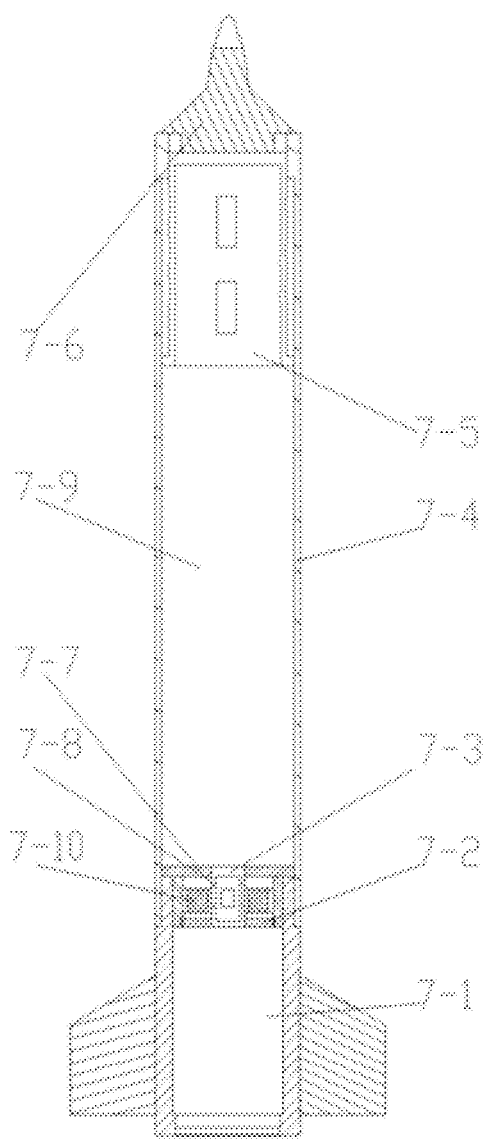
FIG. 6 is a structural schematic diagram of the fire extinguisher bomb of the fire fighting truck applicable to high-rise and super high-rise building fire suppression according to one embodiment of the invention.
Figure 7:
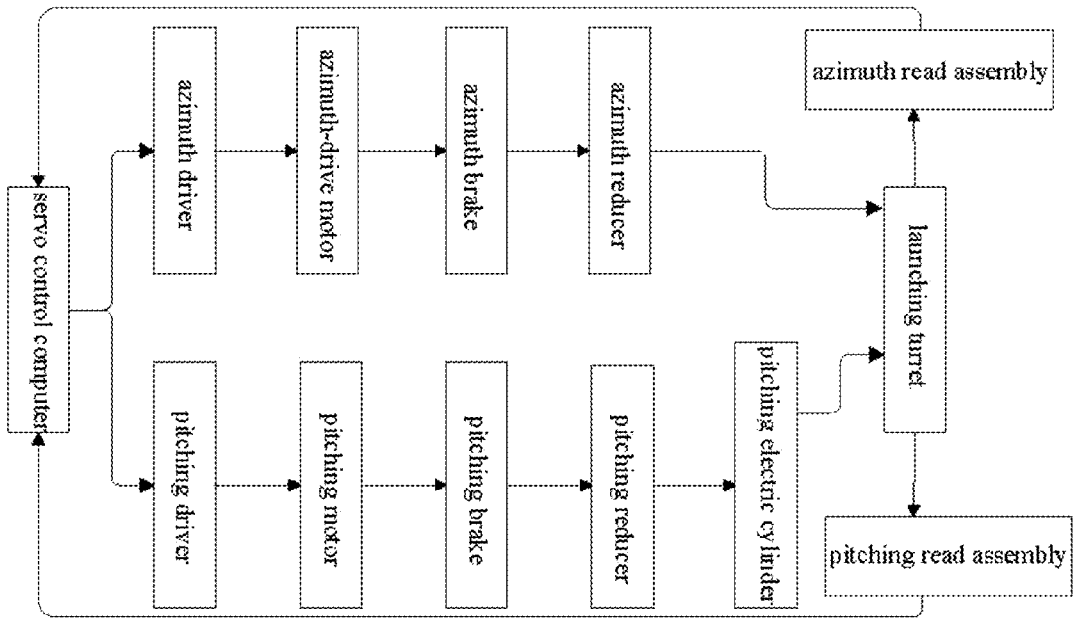
FIG. 7 is a structural schematic diagram of the servo control device of the fire fighting truck applicable to high-rise and super high-rise building fire suppression according to one embodiment of the invention.

FIG. 1 is a schematic diagram of the fire fighting truck applicable to high-rise and super high-rise building fire suppression according to an embodiment of the invention. As shown in FIG. 1, a fire fighting truck applicable to high-rise and super high-rise building fire suppression includes a truck chassis 1, a command control equipment 2, an launch control equipment 3, an equipment compartment 4, an launching apparatus 5, an ejection device 6, a fire extinguishing bomb 7, a turret control apparatus 8 and a photoelectric detection equipment 9.

The command control equipment 2 and the launch control equipment 3 are arranged at the co-pilot position of the cab of the truck chassis 1; the equipment compartment 4 is arranged in the cab and then is fixed on the truck chassis 1 with bolts; the launching apparatus 5 is arranged on the truck chassis 1 and fixed with screws; the ejection device 6 is arranged and fixed on the launching apparatus 5; the fire extinguishing bomb 7 is arranged in the ejection device 6; the turret control apparatus 8 is distributed on the truck chassis and the launching apparatus for completing truck body leveling and controlling the operation of the launching apparatus; the photoelectric detection equipment 9 is arranged below the launching apparatus 5 and fixed with screws.

The truck chassis 1 consists of a general modified chassis and an auxiliary frame. The auxiliary frame which can realize loading other related products such as equipment compartment and launching apparatus and connecting the other related products to the chassis, is a transplantable critical component configured for realizing generalization of the loading equipment on the extinguishing vehicle.

The command control equipment 2 comprises an display control panel 2-1, an information processing machine 2-2, and a communication device 2-3. Specially, the display control panel 2-1 made from sheet metal is arranged on the co-pilot position, on the display control panel 2-1, it is provided with a launch insurance switch, a display, an operating button, an indicator lamp, a control handle, a panoramic camera and so on. The information processing machine 2-2 is connected with the display control panel 2-1 and the communication device 2-3. The communication device 2-3 is used to communicate the operating personnel with fire alarm (119) command control center. The information processing machine 2-2 comprises functional modules such as an integrated management control module, a trajectory solving module and a communication module.

The launch control equipment 3 consists of a launch control execution assembly 3-1 and a fire extinguishing bomb simulator 3-2. In particular, the launch control execution assembly 3-1 is the control equipment, which controls to switch instructions and to send them to the launching apparatus 5, receives the instructions from the information processing machine, and performs the launch control task of the fire extinguishing bomb. The fire extinguishing bomb simulator 3-2 is configured for simulating on-site signals and off-frame launching signals of the fire extinguishing bomb during the extinguishing vehicle training stage.

Inside of the equipment compartment 4 comprises a generating set 4-1, a power supply and distribution cabinet 4-2, and a servo control device 4-3, and outside of that is provided with a communication antenna. The generating set comprises a diesel engine, a generator, a body support and a battery, wherein the general power of power supply is not less than 7.3 kW. Herein, the diesel engine is the power source of the generating set, the generator is the energy conversion device which converts the mechanical energy output by the diesel engine to electric energy, and the battery provides DC control supply for the generating set that has an independent fuel tank during usage. The power supply and distribution equipment fixedly mounted on the right side of equipment compartment, mainly performs the switching operation to the diesel generating set and electric supply, displaying of electric parameter, power distribution and protect function.

The launching apparatus 5 consists of a launching turret 5-1, a launching bracket 5-2, and a module assembling frame 5-3. The cable is provided at center of inner structure of the launching turret 5-1. The launching bracket 5-2 is configured for supporting the module assembling frame and plays a role in rapid loading the module assembling frame 5-3 and in directing during launching, and this mechanism not only realizes the locking and unlocking of the module assembling frame 5-3, but further determines the initial launching direction by cooperating with the support foot on the module assembling frame 5-3.

The ejection device 6 mainly comprises an ejection cylinder, a power plant, and a balanced body. Inside of the ejection cylinder is provided with the fire extinguishing bomb, the power plant and the balanced body. The ejection device, which adopts "confined space" balanced launching technology, has smokeless, light-free, micro-sound, and recoilless characteristics.

The fire extinguishing bomb 7 comprises: a shell 7-4, a fuze 7-6, an igniter 7-3, a fire extinguishing agent 7-9, a main charge 7-10, an empennage braking section 7-1, a combustion chamber 7-8, a blocking plate 7-2, a piston 7-7, and a fairing 7-5.

The shell 7-4, the empennage braking section 7-1 and the piston 7-7 can be lightweight metal materials; the shell 7-4 is cylindric, the empennage braking section 7-1 is arranged at bottom of the shell 7-4 and is fixed to the shell 7-4 with screws, the blocking plate 7-2 is arranged at top of the empennage braking section 7-1, the combustion chamber 7-8 is arranged at top of the blocking plate 7-2 and fixed with the blocking plate 7-2 screw thread, and the combustion chamber 7-8 is fixed to the shell 7-4 with screws. The piston 7-7 is arranged on the combustion chamber 7-8, and the external diameter of the piston 7-7 is matched with the internal diameter of the shell 7-4, the center of the piston 7-7 is provided with a through hole, the igniter 7-3 is arranged in the through hole of piston 7-7 and fixed with the combustion chamber 7-8 screw thread, and the main charge 7-10 is arranged in the combustion chamber 7-8. The fire extinguishing agent 7-9 is arranged in the cavity at the top of the piston 7-7 and is full of whole cavity, the fairing 7-5 is arranged at the top of the shell 7-4 and fixed with the shell 7-4 with dowels, the surface of the fairing 7-5 is provided with a spraying hole, and the fuze 7-6 is arranged on the fairing 7-5 and fixed with screws.

When the fire extinguishing bomb 7 works, the fuze 7-6 transmits the ignition signal to the igniter 7-3 when detecting that fire extinguishing bomb is 5~10 meters away from fire source, and then the igniter 7-3 ignites the main charge 7-10 in the combustion chamber 7-8, combustion of the main charge 7-10 produces high pressure which pushes the piston 7-7 to move in the shell 7-4 and to extrude the fire extinguishing agent 7-9, so that the pin connected between the fairing 7-5 and the shell 7-4 is cut off, the fire extinguishing agent 7-9 continues to push the fairing 7-5 to move forward and the fairing 7-5 is braked at the front end of the shell 7-4, at this moment, the spray hole has been exposed to the air, and now the piston 7-7 continues to push the fire extinguishing agent 7-9 to move forward, and the fire extinguishing agent 7-9 sprays out from the spray hole to attack the fire source for fire suppression. In the flying-spraying process of the fire extinguishing bomb 7, the empennage braking section 7-1 releases a parachute to slow, down the fire extinguishing bomb 7 that penetrates the glass curtain wall to carry out fire extinguishing through the building.

The turret control apparatus 8 consists of a turret servo equipment and a truck body leveling equipment. The turret servo equipment comprises a control computer, a servo control assembly, an azimuth-drive motor, a pitching electric cylinder, an azimuth read assembly, a pitching read assembly, an azimuth servomechanism, and a pivotal bearing, the control computer is provided with a servo control module, the azimuth read assembly and the azimuth servo mechanism are all engaged with the external tooth of the pivotal bearing.

The servo electric cylinder leveling is selected by the truck body leveling equipment, and four servo electric cylinder supporting legs are arranged on auxiliary frame of carriage chassis respectively, and the servo electric cylinder of each supporting leg is respectively driven by a motor. The leveling equipment can be manually withdrawn under the situation without controlling by the information processing machine. The leveling equipment consists of a leveling executing mechanism, a leveling control assembly, a horizontal angle measurement assembly, and a leveling control module. And, four power drivers and the control computer are integrated in a leveling control cabinet, the leveling control cabinet is arranged in the equipment control cabinet.

A tilt sensor is selected by the horizontal angle measurement assembly as the levelness detecting element of the leveling equipment. The levelness of the truck body in the leveling process of the extinguishing vehicle is fed back by two horizon sensors. One horizon sensor arranged on the installed surface on chassis rotary trunnion crossbeam is the main horizon sensor, of which the horizon sensor reading number is the criterion of horizontal and longitudinal levelness of the truck body; another horizon sensor arranged on the front leveling oil cylinder crossbeam is the auxiliary horizon sensor, which feeds back horizontal levelness of head direction in the leveling process to avoid tilt phenomenon of the extinguishing vehicle head in leveling process.

Figure 8:
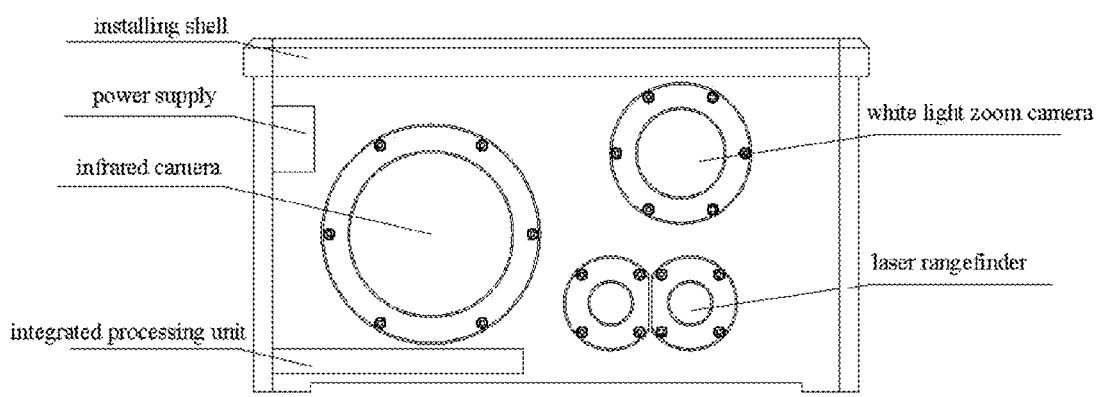
FIG. 8 is a structural schematic diagram of the photoelectric detection equipment of the fire fighting truck applicable to high-rise and super high-rise building fire suppression according to one embodiment of the invention.
Figure 9:
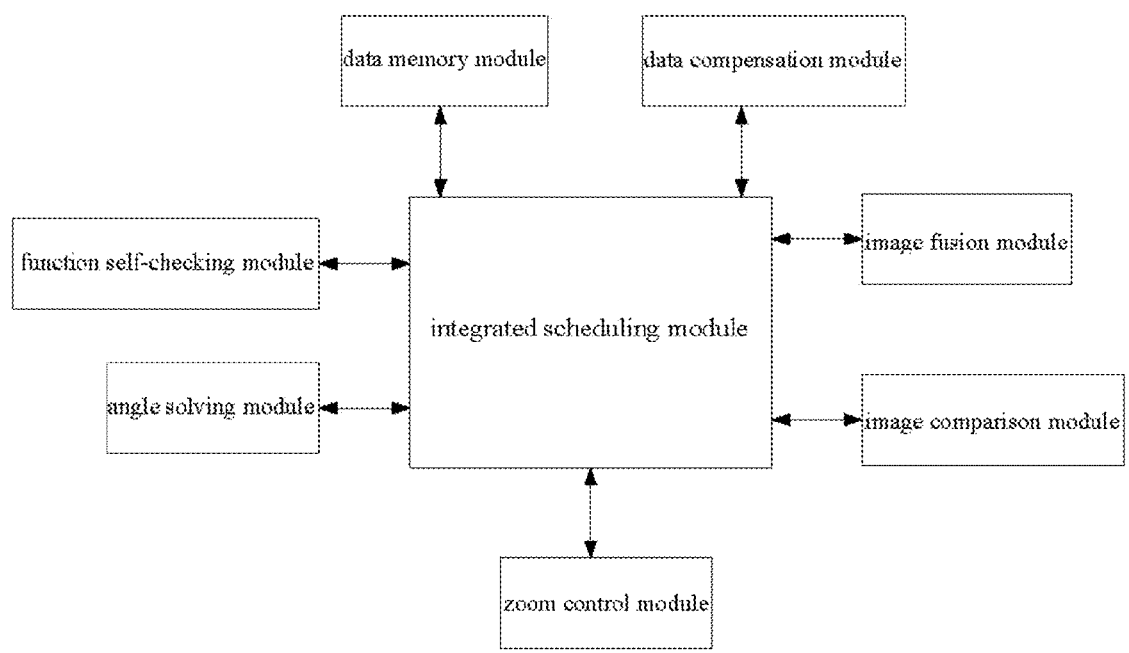
FIG. 9 is a schematic diagram of the functional module of the integrated processing unit of the photoelectric detection equipment of the fire fighting truck applicable to high-rise and super high-rise building fire suppression according to one embodiment of the invention.

FIG. 8 is a schematic diagram of the photoelectric detection equipment 9 of the fire fighting truck applicable to high-rise and super high-rise building fire suppression according to one embodiment of the invention. As shown in FIG. 8, the photoelectric detection equipment 9 comprises: an installing shell, a power supply, a white light zoom camera, an infrared camera, a laser rangefinder, and an integrated processing unit. FIG. 9 is a schematic diagram of the functional module of the integrated processing unit of the photoelectric detection equipment of the fire fighting truck applicable to high-rise and super high-rise building fire suppression according to one embodiment of the invention. As shown in FIG. 9, the integrated processing unit comprises an integrated scheduling module, a data memory module, a function self-checking module, a zoom control module, a data compensation module, an image fusion module, an image comparison module and an angle solving module.

Adopting the white light zoom camera, which can adjust focal length in searching process according to the distance and size of fire source, can determine the position of fire source very accurately.

The white light zoom camera is connected with the installing shell by screws, the infrared camera is connected with the installing shell by screws, the laser rangefinder is connected with the installing shell by screws, the power supply interface of the white light zoom camera is connected with the power supply by wires, the power supply interface of the infrared camera is connected with the power supply by wires, the power supply interface of the laser rangefinder is connected with the power supply by wires, the data interface of the white light zoom camera is connected with the integrated processing unit by wires, the data interface of the infrared camera is connected with the integrated processing unit by wires, and the data interface of the laser rangefinder is connected with the integrated processing unit by wires.

The workflow of the target detection of the photoelectric detection equipment 9 is described with reference to FIG. 10 below.

Figure 10:
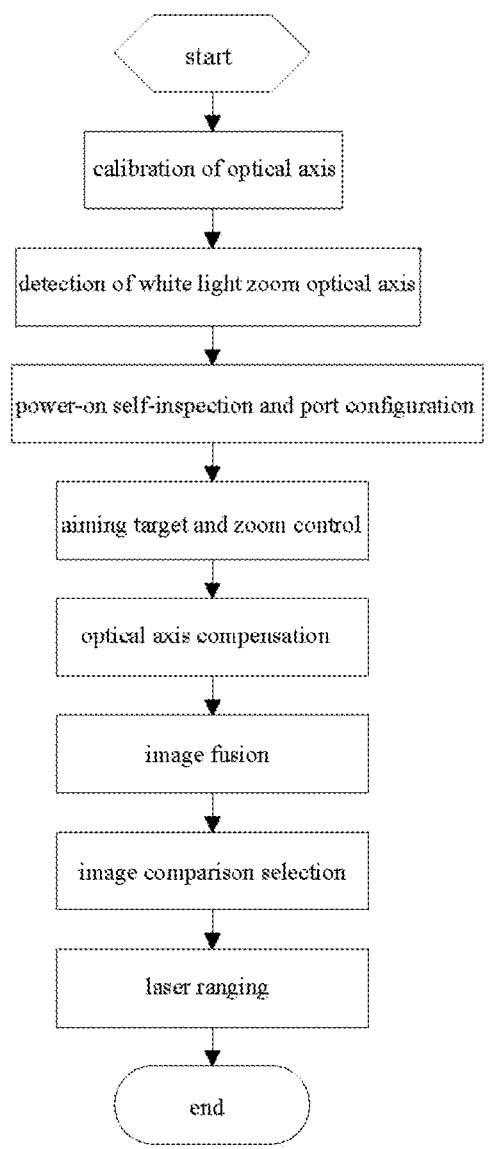
FIG. 10 is a workflow diagram the target detection (position detection) of the photoelectric detection equipment of the fire fighting truck applicable to high-rise and super high-rise building fire suppression according to one embodiment of the invention.

FIG. 10 is a workflow diagram of the target detection (position detection) of the photoelectric detection equipment 9 of the fire fighting truck applicable to high-rise and super high-rise building fire suppression according to one embodiment of the invention. As shown in FIG. 10, the target detection (fire source point aiming) performed by the photoelectric detection equipment 9 mainly includes the following steps:

The First Step (Optional): Calibration of White Light Optical Axis, Infrared Optical Axis and Laser Axis The photoelectric detection equipment 9 may need to carry out the calibration of the white light optical axis, the infrared optical axis and the laser axis before usage (for example, under the condition that photoelectric detection equipment 9 is not used for a long time, and the current reference optical axis and above-mentioned three ones are inconsistent), that is, the calibration (calibration of consistency) of the infrared optical axis, the laser axis and the white light optical axis at the maximum magnification ratio, the installation axes of the white light zoom camera, the infrared camera, and the laser rangefinder are adjusted to make the white light optical axis at the maximum magnification ratio, the infrared optical axis and the laser axis within ±20" of the installing shell datum level, at this moment, above-mentioned three optical axes are supposed to meet the requirement of consistency with each other. After finishing adjustment, the mounting bracket of the white light zoom camera, the infrared camera, and the laser rangefinder are fixed on the installing shell respectively, and the optical axes that are consistent with each other are used as the reference optical axis after adjustment.

The Second Step (Optional): Detection of White Light Zoom Optical Axis Deviation The photoelectric detection equipment 9 may need to carry out the detection of white light zoom optical axis deviation before usage (for example, under the condition that photoelectric detection equipment 9 is not used for a long time), that is, zoom adjustment from the minimum magnification ratio to the maximum magnification ratio is carried out successively, the deviation value of the white light optical axis of white light zoom camera at different magnification ratios relative to the white light optical axis at the maximum magnification ratio (reference optical axis) (for example, deviation angle of the current optical axis relative to reference optical axis in three directions), and the deviation value is kept in the data memory module.

The Third Step: Power-on Self-Inspection and Port Configuration (Device Initialization)

The photoelectric detection equipment 9 starts the power supply to power on the device, and the white light zoom camera, the infrared camera, the laser rangefinder, and the integrated processing unit can be powered on simultaneously. The function self-checking module carries out self-inspection and initialization to the white light zoom camera, the infrared camera, the laser rangefinder and the integrated processing module, and carries out port communication state configuration after initialization.

The Fourth Step: Aiming a Target and Zoom Control

A target (fire source) is aimed by the photoelectric detection equipment 9 by utilizing the white light zoom camera. Specifically, the photoelectric detection equipment 9 is rotated by utilizing the turret, so that the target is present in the visual field of the white light zoom camera (and displayed on a display screen), the magnification ratio of the white light zoom camera is controlled by the zoom control module, the aimed target is centered on the display screen (target ranging image central point is aimed at target point), and height is adjusted as ¾ of the whole picture height on the display screen (also can be other ratio, only the image is displayed completely and meets definition requirement).

The Fifth Step: Optical Axis Compensation

According to the current magnification ratio (the magnification ratio after aiming and zoom controlling) of the white light zoom camera, the optical axis deviation value stored in the data memory module is read by the data compensation module to carry out data compensation. That is, according to the optical axis deviation value at the current magnification ratio, the angle of the photoelectric detection equipment 9 is fine adjusted to make the white light optical axis at the current magnification ratio conform to the reference optical axis (i.e. new central point is aimed at target point after target ranging image data compensation).

The Sixth Step (Optional): Images Fusion

Alternatively, under the condition that target images are obtained by the infrared camera (to make the tartlet be present in the visual field of infrared camera), the images aimed and zoom controlled by the white light zoom camera and the images obtained by the infrared camera are read by the integrated scheduling module, then, the images are fused by the image fusion module. That is, the images obtained by the infrared camera are zoomed in or out to the magnification ratio (keep the target size consistent in two images and centered), corresponding with that of the images aimed and zoom controlled by the white light zoom camera, the transverse and longitudinal pixel count of the two images to be fused are made consistent by cropping the images, and the two images are fused (can be realized by various methods, for example, average the same pixel gray level, etc.) to obtain the fused image.

The Seventh Step (Optional): Image Comparison Selection

The acutance of the white light camera image, the infrared camera, image (under the situation that target image is obtained by the infrared camera, zoom in or out correspondingly), and/or above-mentioned fused images (under the situation that target image is obtained by the infrared camera) are compared (for example, image acutance comparison can be realized by utilizing the image processing algorithm of image filtering projecting edge, and he overall acutance of image is judged from the gradient reflected by the pixel of image at each edge) by the image comparison module to determine the images with the highest acutance as the images needed by target range finding.

The Eighth Step: Laser Ranging the laser ranging is carried out for several times (for example, 5 times) by the laser rangefinder continuously, the intermediate value three data is averaged by the integrated scheduling module after removing the maximum and minimum from five-time-metered distance, and this average value is used as target slant distance, thus the search and measurement to target is performed by the detection device.

As shown in FIG. 9, the angle solving module is used for solving the trajectory solving angle (i.e., launching angle information) of the fire extinguishing bomb. The data compensation module is also used for recording bomb axis deviation and data compensation.

The workflow of fire extinguishing bomb trajectory solving of the target detection of the photoelectric detection equipment 9 is described with reference to FIG. 10 below.

Figure 12:
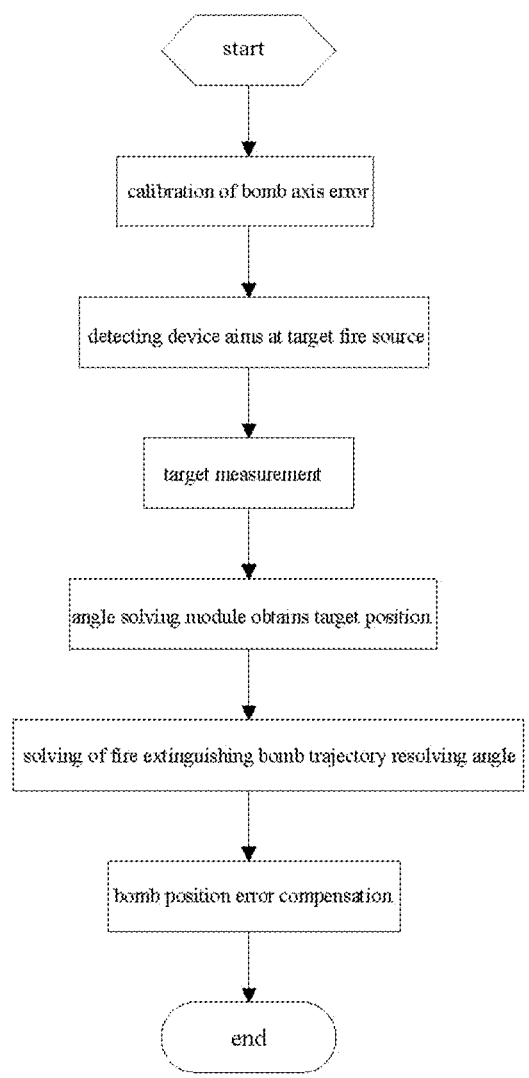
FIG. 12 is a workflow diagram of the photoelectric detection equipment of the fire fighting truck applicable to high-rise and super high-rise building fire suppression according to one embodiment of the invention.

FIG. 12 is a workflow diagram of fire extinguishing bomb trajectory solving of the photoelectric detection equipment of the fire fighting truck applicable to high-rise and super high-rise building fire suppression according to one embodiment of the invention. Specifically, after finishing the laser ranging, the oblique line distance L between the target fire source and the fire extinguishing bomb is obtained by the photoelectric detection equipment φ, meanwhile, the pitch angle θ and azimuth angle φ (for example, azimuth angle at φ the turret center can be 0) of the target relative to the turret is passed back the integrated scheduling module by the turret system, fire extinguishing bomb trajectory solving is carried out by the photoelectric detection equipment to solve the launching angle information of the fire extinguishing bomb.

That is to say, bomb launching pitching angle $\psi_f$ and launching azimuth angle $\phi_f$ are solved by the solution module according to target slant distance L and target pitching angle θ and target azimuth angle φ, so that the target can be hit when the bomb at the launching pitching angle $\psi_f$ and launching azimuth angle $\phi_f$ (under the error excepted condition, the launching azimuth angle can be the azimuth angle at the turret center, for example 0).

The specific steps of fire extinguishing bomb trajectory solving are as follows.

Figure 11:
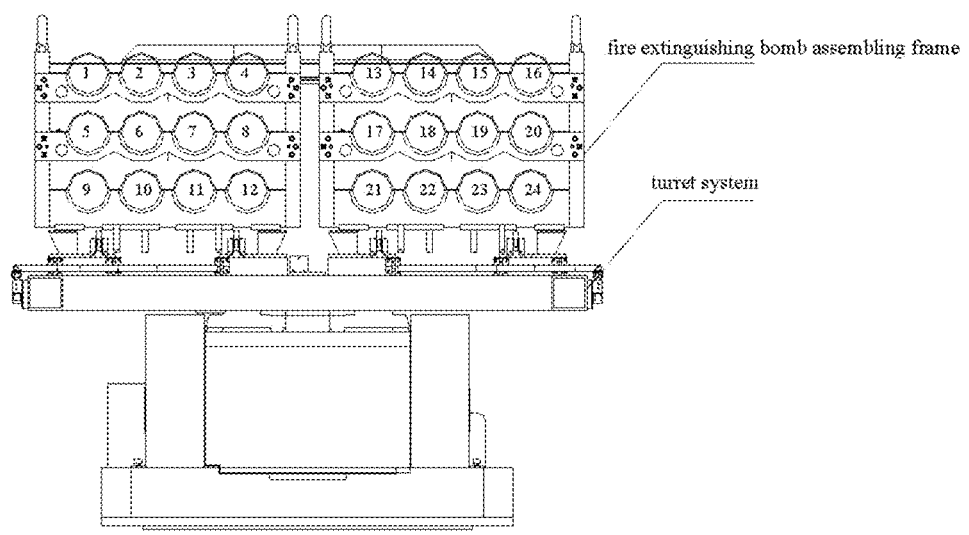
FIG. 11 is a schematic diagram of the fire extinguishing bomb assembling frame and turret system of the fire fighting truck applicable to high-rise and super high-rise building fire suppression according to one embodiment of the invention.

The first step (optional): the position and axis of the fire extinguishing bomb at different frame positions (taking 24 frame positions shown in FIG. 11 as example) are slightly different, the left-right position deviation and upper-lower position deviation of each fire extinguishing bomb assembling frame position and detection device optical axis, and course (orientation) deviation angle and pitching deviation angle are calibrated, and four deviation data are recorded in the data compensation module.

The second step: the height information of the target fire source relative to the fire extinguishing bomb and the horizontal distance ranged from the target to the launching point are obtained by solving the oblique line distance of the target and the pitching angle by the angle solving module. The solution formula is shown as follows:

$$h0 = L \times \sin\theta$$

$$d = L \times \cos\theta$$

In the formula: θ is the pitching angle of the fire extinguishing bomb assembling frame, L is the oblique line distance ranged from the fire extinguishing bomb assembling frame to the target, h0 is the height information of the target fire source relative to the fire extinguishing bomb, and d is the horizontal distance ranged from the target to the launching point.

The third step: the ejection angle of the fire extinguishing bomb is solved by the angle solving module.

The angle solving module is based on the following dynamics and the kinematical equations:

Dynamic Differential Equations $$\dot{u} - v\omega_{Z1} + w\omega_{Y1} = (-mg\sin\phi\cos\psi - C_A qS_M)/m \quad (1)$$

$$\dot{v} + u\omega_{Z1} = [mg(\sin\phi\sin\psi\sin\gamma - \cos\phi\cos\gamma) - C_N qS_M \cos\psi']/m \quad (2)$$

$$\dot{w} - u\omega_{Y1} = [mg(\sin\phi\sin\psi\cos\gamma + \cos\phi\sin\gamma) - C_N qS_M \sin\phi']/m \quad (3)$$

$$J_{Y1}\dot{\omega}_{Y1} = -C_N qS_M \Delta l \sin\phi' + C_{ZY1} qS_M l\omega_{Y1} \quad (4)$$

$$J_{Z1}\dot{\omega}_{Z1} = C_N qS_M \Delta l \cos\phi' + C_{ZZ1} qS_M l\omega_{Z1} \quad (5)$$

Kinematics Differential Equations $$\dot{X} = u\cos\phi\cos\psi - v(\sin\phi\cos\gamma + \cos\phi\sin\psi\sin\gamma) + w(\sin\phi\sin\gamma - \cos\phi\sin\psi\cos\gamma) \quad (6)$$

$$\dot{Y} = u\sin\phi\cos\psi + v(\cos\phi\cos\gamma - \sin\phi\sin\psi\sin\gamma) - w(\cos\phi\sin\gamma + \sin\phi\sin\psi\sin\gamma) \quad (7)$$

$$\dot{Z} = u\sin\psi - v\cos\psi\sin\gamma + w\cos\psi\cos\gamma / \quad (8)$$

$$\dot{\phi}(\omega_{Y1}\sin\gamma + \omega_{Z1}\cos\gamma)/\cos\psi \quad (9)$$

$$\dot{\psi} = \omega_{Z1}\sin\gamma - \omega_{Y1}\cos\gamma \quad (10)$$

$$\dot{\gamma} = -\dot{\psi}\sin\psi \quad (11)$$

Under force and moment effect at a certain moment, the increment of the main flight parameters of the fire extinguishing bomb are calculated by utilizing above-mentioned kinematics and dynamic differential equations. In above-mentioned kinematics and dynamic differential equations, the input (known quantity) is the flight parameters of fire extinguishing bomb at a certain moment, including: velocity, trajectory tilt angle, trajectory deflection angle, yaw rate, pitching angle velocity, pitching angle, yaw angle, roll angle and position coordinates X, Y, Z of the fire extinguishing bomb in launching coordinate system. The output is the increment (dx/dt) of above 11 parameters at this moment. Its main input/output parameters are shown in the following table.

| input | | output | |
|---|---|---|---|
| mathematical symbol | implication | mathematical symbol | implication |
| u | bomb body axial velocity | $\dot{u}$ | bomb body axial velocity increment |
| v | bomb body normal velocity | $\dot{v}$ | bomb body normal velocity increment |
| w | bomb body transverse velocity | $\dot{w}$ | bomb body transverse velocity increment |
| $\omega_{Y1}$ | yaw angle velocity | $\dot{\omega}_{Y1}$ | yaw angle velocity increment |
| $\omega_{Z1}$ | pitch angle velocity | $\dot{\omega}_{Z1}$ | pitch angle velocity increment |
| $\phi$ | pitch angle | $\dot{\phi}$ | pitch angle increment |
| $\psi$ | yaw angle | $\dot{\psi}$ | yaw angle increment |
| $\gamma$ | roll angle | $\dot{\gamma}$ | roll angle increment |
| X | X-axis coordinate | $\dot{X}$ | X increment |
| Y | Y-axis coordinate | $\dot{Y}$ | Y increment |
| Z | Z-axis coordinate | $\dot{Z}$ | Z increment |

In addition, m is bomb body mass, g is acceleration of gravity, q is dynamic pressure, $C_A$ is axial force coefficient, $S_M$ is fire extinguishing bomb reference area, $C_N$ is normal force coefficient, $\psi'$ is synthetic attack angle, $J_{Y1}$ is rotary inertia around bomb body Y-axis, $J_{Z1}$ is rotary inertia around bomb body Z-axis, $C_{ZY1}=C_{ZZ1}$ is damping moment coefficient, l is fire extinguishing bomb reference length, and $\Delta l$ is length from the fire extinguishing bomb barycenter to the pressure center.

The target pitching angle θ, off-cylinder launching velocity (constant, for example 160 meter per seconds), and angular velocity initial value (for example, 0) as initial conditions to solving above-mentioned differential equations, by combining with aerodynamic parameters (constant, mainly as variation of axial force coefficient, normal force coefficient, pressure center coefficient, and damping moment coefficient along with Mach number and attack angle) of the fire extinguishing bomb, above-mentioned equations are jointly solved by using the quadravalence Runge-Kutta numerical solution of ordinary differential equation (ODE), and overall trajectory parameters (i.e. ballistic trajectory) u(t), v(t), w(t), $\omega_{Y1}$(t), $\omega_{Z1}$(t), X(t), Y(t), Z(t), φ(t), ψ(t), γ(t) are obtained by calculating, wherein, t is discretized time. After calculating the overall trajectory parameters under a certain trajectory pitching angle φ (initial value φ0=θ), the range height H corresponding to the horizontal distance d is calculated at a certain trajectory pitching angle φ.

$$|H_k - h0| \leq 0.01 \quad (12)$$

$$\phi_{k+1} = \phi_k + 0.5(H_k - h0)\theta \quad (13)$$

The relationship of size of H and the target height h0 is determined by using formula (12), stop the iteration if it meets formula (12), and current pitching angle k is launching pitching angle; if it does not meet formula (12), formula (13) is used to upgrade the launching pitching angle, the overall trajectory parameters and range height $H_{k+1}$ are recalculated with the dynamics and kinematics differential equations, wherein k is current iteration step number, until the difference between the range height $H_k$ and target height h0 is less than 0.01 m, now the launching pitching angle φk is the final fire extinguishing bomb launching pitching angle.

That is to say, the initial pitching angle φ0 of iteration is the target pitching angle θ, afterwards by comparing relation of the trajectory H and target height 110 at target X axial distance (i.e. horizontal distance d), the launching pitching angle is constantly corrected to finally obtain the result to hit the target.

The Fourth Step (Optional): Error Compensation is Carried Out by the Data Compensation Module The overall trajectory parameter is determined and calculated by taking detection device as position and azimuth reference, four deviation data of position and angle caused by different fire extinguishing bomb positions are eliminated by charge computer through compensation, thereby the pitching angle required by launching at certain unit is determined.

So far, high-rise building fire extinguishing bomb trajectory solving is achieved, and the fire extinguishing bomb can be launched according to the calculated launching angle.

Finally, taking practical application as example, the workflow of the fire fighting truck applicable to high-rise and super high-rise building fire suppression according to one embodiment of the invention includes the following steps:

The first step: personnel are in place to start the vehicle and set out.

1) After receiving fire alarm, the driver and operator sit in pilot and co-pilot position respectively;

2) The driver starts the fire fighting truck, turns on backup image equipment, and drives to fire place;

3) The operator checks operation desk to guarantee that operating buttons are all at the initial position.

The Second Step: The Generating Set is Started, and Each Device is Powered and Self-Inspected 1) The operator turns the "units start-up" key to "START" position and loosens the key (key auto-returned "ON" position) after starting the generating set successfully, and "AC display" lamp is on after working stably;

2) The operator presses "total power supply" button to output the generating set power supply;

3) The operator presses "equipment power supply" button, the information processing machine is powered on first for log-in and self-inspection, the information processing machine successively powers on the detection device, the servo equipment, and the leveling equipment automatically when it is normal;

4) The operator checks "device state" column in display interface, and confirms that each device in power-on and self-inspection state is "green".

The third step: select operation mode and stop at a suitable place

1) The operator turns operation desk "operation mode" knob, and selects "fire-fighting" or "training" operation mode in driving process;

2) According to instruction sent by the operator according to on-the-spot fire target height, the driver observes backup image and drives the extinguishing vehicle for temporary parking near fire site;

3) The operator checks "leveling control" column state, if the extinguishing vehicle parking spot gradient exceeds by ±1°, the "leveling control" column indicator lamp "red & green" flicker alternately, the driver reselects place for parking, until the "leveling control" column indicator lamp stops flickering, and "recovery" indicator lamp is green;

4) The driver controls the extinguishing vehicle parking, gets off, and is responsible for observing the situation of extinguishing vehicle within launching safe distance, and communicates with operator in time.

The Fourth Step: Unfold Leveling to Aim at Fire Target

1) The operator turns operation desk "leveling control" knob to "unfolding" position, the extinguishing vehicle automatic leveling unfolds, "unfolding" indicator lamp flickers in leveling process, after finishing leveling, operation desk "unfolding" indicator lamp is on, and display interface "leveling control" column "unfolding" lamp turns to "green";

2) The launching turret turns to unlock;

3) The operator controls operation desk handle, observes display interface image, switches to "imaging pattern" (showing the viewfinder image of white light camera on the screen display), controls launching turret turning, and aims the display interface "+" to fire target, and now "current angle" column shows launching turret current position angle.

The Fifth Step: Measure the Target Location, and Solve Firing Data (Launching Angle)

1) Under the situation that the target range can be measured accurately with the laser rangefinder directly, the operator controls the button on the handle to measure fire target location parameter, "target location" column display target "distance" and "height" data;

2) Under the situation that the target range cannot be measured accurately with the laser rangefinder directly (i.e. aiming at A but launching B), the actual fire point is point B which cannot meet accuracy requirement of the laser rangefinder, the point A near the point B is aimed for range finding, according to the change in location between point A and point B, the point A range data is transformed into point B range data, and then firing data at point B is calculated.

3) The command control device, according to target data, solves firing data automatically, and judges whether the solved result is effective (the azimuth angle and pitching angle whether in the limited range) simultaneously, and the effective solved results are shown in "launching angle" column.

The Sixth Step: Select Launching Mode and Unlock Launching Insurance

1) The operator selects operation desk "launching mode" to "manual" or "automatic" pattern;

2) The operator turns operation desk "launching insurance" key, to "unlock" position, and starts to record video;

3) The operator keeps in touch with the driver outside of the car, and confirms that there are no people in launching safe region.

The Seventh Step: Turn the Launching Turret and Launch the Fire Extinguishing Bomb 1) when the operator selects "launching mode" to be "automatic", the "launching button" indicator lamp with launching conditions is on, the operator presses the "launching button" corresponding to the launching fire extinguishing bomb to be launched, according to the solved results corresponding to this fire extinguishing bomb, the information processing machine automatically controls the launching turret to turn to the target launching angle, "allow launching" indicator lamp on the operation desk is on, and the fire extinguishing bomb is launched;

2) when the operator selects "launching mode" to be "manual", the "allow launching" indicator lamp is first extinguished, the operator first controls the operation desk handle to turn to launching turret to launching angle, that is "current angle" column number value and "launching angle" column number value are within certain error range, now the "allow launching" indicator lamp is on, the "launching button" indicator lamp with launching conditions is on, and the operator presses the "launching button" for launching the fire extinguishing bomb.

The Eighth Step: Launch the Fire Extinguishing Bomb

1) The launch control equipment provides igniting timing signal;

2) The igniting timing signal is delivered to launching cylinder igniter by module cable box;

3) The launching cylinder propellant powder is ignited, and the fire extinguishing bomb is launched out of the cylinder at certain initial velocity.

The Ninth Step: Start Time-Delayed Propellant Self-Destruction Timing

1) The time-delayed propellant starts self-destruction timing under the effect of launching shock overload. When delay time is up, the time-delayed propellant controls the fire extinguishing bomb to open parachute and spray fire-extinguishing agent at the same time, and the fire extinguishing bomb is self-destructed.

The Tenth Step: Start Fuze to Work

High-rise fire mainly contains three kinds of situations including indoor fire, external walls fire, and fire inside the walls, this paper puts emphasis on considering putting out indoor fire to describe the workflow of fuze.

Wherein, starting the fuze to work in the tenth step includes two sub-steps:

Sub-Step 10-1, Relieve Fuze Insurance, and Start Function

1) The fuze detects and approaches the target

2) The fuze machine insurance is unlocked

3) Under the effect of launching shock overload, machinery insurance of the fuze is unlocked due to inertia, and the firing circuit turns to off-state from short circuit state;

4) Fuze long distance releasing insurance is unlocked

5) After the fuze delaying set time, long distance releasing insurance (electricity insurance) release, and fuze is in state of readiness;

6) Fuze self-destruction timing starting

7) The fuze circuit works, starts self-destruction time-delay, the fuze, time-delayed propellant and fire extinguishing bomb main charge are connected in parallel to improve fire extinguishing bomb self-destruction reliability. When delay time is up, the fuze controls the fire extinguishing bomb to open parachute and spray fire-extinguishing agent at the same time, and the fire extinguishing bomb is self-destructed.

Sub-Step 10-2: Trigger Fuze

The fuze or time-delayed propellant provides ignition signal, and the fire extinguishing bomb sprays fire-extinguishing agent simultaneously after receiving the ignition signal, and opens a parachute to slow down.

The various functions of fuze are arranged as follows:

1) the fuze is mainly applied in proximity trigger function;

2) the fuze impact function is used as supplement after proximity function failure, which guarantees that the fire extinguishing bomb sprays fire-extinguishing agent for fire extinguishing in time after arriving conflagration area;

3) The fuze self-destroying function is that provides ignition signal regularly and forcedly under situation that the fire extinguishing bomb departs from trajectory and does not meet proximity and impact triggering condition, or failure of proximity and impact function at the same time, which can avoid that the fire extinguishing bomb to carry initiating explosive device freely falling, and cause harm to personnel and equipment, or the residual initiating explosive device on the fire extinguishing bomb causes dangerous to reclaim.

The Eleventh Step: Fire Extinguishing Bomb Action

1) The fire extinguishing bomb drag parachute finishes air inflation before the fire extinguishing bomb getting into the room and possess deceleration conditions, and the drag parachute cannot exert an influence to fire extinguishing bomb trajectory before the fire extinguishing bomb getting into the room;

2) After the fire extinguishing bomb getting into the room, the drag parachute draws the fire extinguishing bomb to slow down, so that the fire extinguishing bomb does not break up after hitting against the wall, and wall body is not penetrated;

3) The fire extinguishing bomb continues spraying fire-extinguishing agent in action process of the drag parachute, and inflation time of the drag parachute and total time of fire extinguishing bomb spraying fire-extinguishing agent accounts for not more than 30%.

The Twelfth Step: Trigger the Time-Delayed Propellant Self-Destruction

1) The time-delayed propellant self-destruction function is identical with the fuze self-destruction function, but the two are installed independently, and do not interfere with each other. The object is to improve use security of the fire extinguishing bomb under abnormal operation situation. Meanwhile, it is also can be used for supplementing fire-extinguishing function after fuze failure when the fire extinguishing bomb getting the room.

2) After launching the fire extinguishing bomb, 3000 g overload is produced, the time-delayed propellant starts triggering timing automatically, after delaying 8 s by the time-delayed propellant, the self-destruction ignition signal is forced to provide.

The time-delayed propellant self-destruction work process is as follows:

After launching the fire extinguishing bomb, time-delayed propellant self-destruction time delay starts timing 8 s automatically;

When time-delayed propellant self-destruction time delay timing time is up, automatic self-destruction ignition signal is forced to provide;

After receiving ignition signal, the fire extinguishing bomb triggers payload section and safe braking section to work simultaneously, the payload section sprays fire-extinguishing agent, and the safe braking section opens a parachute.

The thirteenth step: the system is withdraw, and the equipment is power off

1) The operator turns the operation desk "launch insurance" key to "locking" position, and "allow launching" lamp is extinguished, and video recording is stopped;

2) The operator turns the operation desk "leveling control" knob to "recovery" position, system is started to withdraw, the launching turret is returned to normal position (azimuth angle is 0°, pitching angle is 0°) automatically by the system, then four leveling supporting legs are reclaimed to initial position, the "recovery" lamp flickers, and the "recovery" lamp is on after putting in place;

3) The operator turns the operation desk "operation mode" knob to "training" state;

4) The operator presses the operation desk "equipment power supply" button, first the information processing machine closes subsystem device power supply (DPS), then closes the information processing machine power supply;

5) The operator presses the operation desk "total power supply" button, shutdown system power supply;

6) The operator turns the operation desk "units start-up" key, to "OFF" position, the generating set is closed, and "AC display lamp" is extinguished;

The Fourteenth Step: The Vehicle Returns for Flame-Out, and Personnel Gets Off

1) The driver gets on to the driver position, and starts the fire fighting truck and returns to guard station;

2) The driver turns off backup image equipment, and closes fire fighting truck;

3) The driver and operator get off.

The invention claimed is:

1. A fire fighting truck applicable to high-rise and super high-rise building fire suppression, characterized in that, comprising a truck chassis (1), a command control equipment (2), an launch control equipment (3), an equipment compartment (4), a launching apparatus (5), an ejection device (6), a fire extinguishing bomb (7), a turret control apparatus (8) and a photoelectric detection equipment (9);

wherein, the command control equipment (2) and the launch control equipment (3) are arranged in a co-pilot position of a cab of the truck chassis (1);

the equipment compartment (4) is arranged behind the cab and is fixed on the truck chassis (1) with a bolt;

the launching apparatus (5) is arranged on the truck chassis (1) and is fixed with screw nails;

the ejection device (6) is arranged on the launching apparatus (5) and fixed;

the fire extinguishing bomb (7) is arranged within the ejection device (6);

the turret control apparatus (8) is distributed on the truck chassis and the launching apparatus for accomplishing the actions of leveling truck body and controlling the launching apparatus;

the photoelectric detection equipment (9) is arranged below the launching apparatus (5) and fixed with screw nails;

wherein, the photoelectric detection equipment (9) comprises an installing shell, a power supply, a white light zoom camera, an infrared camera, a laser rangefinder and an integrated processing unit;

the white light zoom camera is connected to the installing shell by a screw, the infrared camera is connected to the installing shell by a screw; the laser rangefinder is connected to the installing shell by a screw; the power supply interface of the white light zoom camera is connected to the power supply via a wire; the power supply interface of the infrared camera is connected to the power supply via a wire; the power supply interface of the laser rangefinder is connected to the power supply via a wire; the data interface of the white light zoom camera is connected to the integrated processing unit via a wire; the data interface of the infrared camera is connected to the integrated processing unit via a wire; the data interface of the laser rangefinder is connected to the integrated processing unit via a wire.

2. The fire fighting truck applicable to high-rise and super high-rise building fire suppression of claim 1, wherein the integrated processing unit comprises an integrated scheduling module, a data memory module, a zoom control module, and a data compensation module;

wherein, before fire fighting, a fire source as target is aimed by the photoelectric detection equipment (9) by utilizing the white light zoom camera, wherein, the photoelectric detection equipment (9) is rotated by utilizing the turret, so that the target is present in the visual field of the white light zoom camera and displayed on a display screen, the magnification ratio of the white light zoom camera is controlled by the zoom control module, and the aimed target is centered on the display screen and displayed in its entirety;

according to the current magnification ratio of the white light zoom camera, the optical axis deviation value stored in the data memory module is read by the data compensation module to carry out data compensation, wherein, according to the optical axis deviation value at the current magnification ratio, the angle of the photoelectric detection equipment (9) is fine adjusted to make the white light optical axis at the current magnification ratio conform to the reference optical axis;

the laser ranging is performed continuously multiple times by the laser rangefinder, the measured distances of multiple times are averaged by the integrated scheduling module, and this average is used as target slant distance, thus the search and measurement to target is completed by the detection device.

3. The fire fighting truck applicable to high-rise and super high-rise building fire suppression of claim 2, wherein, before detecting fire source, under the condition that the current reference optical axis and above-mentioned three optical axes are inconsistent, the optical axes of the white light zoom camera, the infrared camera and the laser rangefinder are calibrated, that is the optical axis of the infrared camera, the optical axis of the laser rangefinder, and the optical axis of the white light zoom camera at the maximum magnification ratio are adjusted to be consistent, and the optical axes that are consistent with each other are used as the reference optical axis after adjustment;

the optical axis deviation of the white light zoom is detected, wherein, the zoom adjustment is carried out from the minimum magnification ratio to the maximum magnification ratio successively, the optical axis deviation amount of the white light optical axis of the white light zoom camera relative to the reference optical axis at different magnification ratios is detected and is stored in the data memory module.

4. The fire fighting truck applicable to high-rise and super high-rise building fire suppression of claim 3, wherein, the integrated processing unit also comprises a function self-checking module, and before detecting fire source, the power supply is started to power the equipments and power the white light zoom camera, the infrared camera, the laser rangefinder, and the integrated processing unit simultaneously, the white light zoom camera, the infrared camera, the laser rangefinder and the integrated processing module are self-checked and initialized by the function self-checking module, and the port communication state is configured after initialization.

5. The fire fighting truck applicable to high-rise and super high-rise building fire suppression of claim 2, wherein the integrated processing unit also comprises an image fusion module, under the condition that target images are obtained by the infrared camera, the images aimed and zoom controlled by the white light zoom camera and the images obtained by the infrared camera are read by the integrated scheduling module, then, the images fusing treatment is performed by the image fusion module, wherein, the images obtained by the infrared camera are zoomed in or out to the magnification ratio corresponding to that of the images aimed and zoom controlled by the white light zoom camera, the transverse and longitudinal pixel number of the two images to be fused are made to be consistent by image cropper, and the two images are fused to obtain the fused image;

wherein, the photoelectric detection equipment (9) also comprises an image comparison module, and the detection of fire source performed by the photoelectric detection equipment (9) further includes the following steps:

the sharpness of the white light camera image, the infrared camera image, and/or above-mentioned fused images are compared by the image comparison module to determine the images with the highest sharpness as the image required by target range finding.

6. The fire fighting truck applicable to high-rise and super high-rise building fire suppression of claim 1, wherein, the turret control apparatus (8) consists of a turret servo equipment and a truck body leveling equipment, the turret servo equipment comprises a control computer, a servo control assembly, an azimuth-drive motor, a pitching electric cylinder, an azimuth read assembly, a pitching read assembly, an azimuth servomechanism, and a pivotal bearing; the control computer is provided with a servo control module; the azimuth read assembly and the azimuth servo mechanism are all engaged with the external tooth of the pivotal bearing;

wherein, the truck body leveling equipment comprises a leveling executing mechanism, a leveling control assembly, and a horizontal angle measurement assembly, and is provided with a leveling control module, wherein, four power drivers and the control computer are integrated in a leveling control cabinet, the leveling control cabinet is arranged in the middle of the equipment control cabinet, the levelness of the truck body is fed back by two horizon sensors in the leveling process of the extinguishing vehicle, wherein one horizon sensor arranged on the installed surface on chassis rotary trunnion crossbeam is the main horizon sensor, and the reading number of this horizon sensor is the criterion of horizontal and longitudinal levelness of the truck body; another horizon sensor arranged on the front leveling oil cylinder crossbeam is the auxiliary horizon sensor, and it feeds back horizontal levelness of head direction in the leveling process.

7. The fire fighting truck applicable to high-rise and super high-rise building fire suppression of claim 2, wherein, the integrated processing unit also comprises an angle solving module, wherein, the angle solving module is used for solving launching angle information of the fire extinguishing bomb;

wherein, after finishing the laser ranging, the oblique line distance L between the target fire source and the fire extinguishing bomb is obtained by the photoelectric detection equipment (9), meanwhile, the pitching angle θ of the target relative to the turret is passed back to the integrated scheduling module by the turret system, the fire extinguishing bomb trajectory solution is carried out by the photoelectric detection equipment (9) to solve the launching angle information of the fire extinguishing bomb;

wherein, solving the launching angle information of the fire extinguishing bomb by the photoelectric detection equipment (9) includes the following steps:

the angle solving module is based on the following dynamics and kinematics differential equations:

Dynamic Differential Equations $$\dot{u}-v\omega_{Z1}+w\omega_{Y1}=(-mg\sin\phi\cos\psi-C_A qS_M)/m \quad (1)$$

$$\dot{v}+u\omega_{Z1}=[mg(\sin\phi\sin\psi\sin\gamma-\cos\phi\cos\gamma)-C_N qS_M\cos\psi']/m \quad (2)$$

$$\dot{w}-u\omega_{Y1}=[mg(\sin\phi\sin\psi\cos\gamma+\cos\phi\sin\gamma)-C_N qS_M\sin\phi']/m \quad (3)$$

$$J_{Y1}\dot{\omega}_{Y1}=-C_N qS_M\Delta l\sin\phi'+C_{ZY1}qS_M l\omega_{Y1} \quad (4)$$

$$J_{Z1}\dot{\omega}_{Z1}=C_N qS_M\Delta l\cos\phi'+C_{ZZ1}qS_M l\omega_{Z1} \quad (5)$$

Kinematics Differential Equations $$\dot{X}=u\cos\phi\cos\psi-v(\sin\phi\cos\gamma+\cos\phi\sin\psi\sin\gamma)+w(\sin\phi\sin\gamma-\cos\phi\sin\psi\cos\gamma) \quad (6)$$

$$\dot{Y}=u\sin\phi\cos\psi+v(\cos\phi\cos\gamma-\sin\phi\sin\psi\sin\gamma)-w(\cos\phi\sin\gamma+\sin\phi\sin\psi\sin\gamma) \quad (7)$$

$$\dot{Z}=u\sin\psi-v\cos\psi\sin\gamma+w\cos\psi\cos\gamma)/ \quad (8)$$

$$\dot{\phi}=(\omega_{Y1}\sin\gamma+\omega_{Z1}\cos\gamma)/\cos\psi \quad (9)$$

$$\dot{\psi}=\omega_{Z1}\sin\gamma-\omega_{Y1}\cos\gamma \quad (10)$$

$$\dot{\gamma}=-\dot{\psi}\sin\psi \quad (11)$$

in the above-mentioned dynamics and kinematics differential equations, their inputs and outputs are as follows:

| input | | output | |
|---|---|---|---|
| mathematical symbol | meaning | mathematical symbol | meaning |
| u | bomb body axial velocity | $\dot{u}$ | bomb body axial velocity increment |
| v | bomb body normal velocity | $\dot{v}$ | bomb body normal velocity increment |
| w | bomb body transverse velocity | $\dot{w}$ | bomb body transverse velocity increment |
| $\omega_{Y1}$ | yaw angle velocity | $\dot{\omega}_{Y1}$ | yaw angle velocity increment |
| $\omega_{Z1}$ | pitch angle velocity | $\dot{\omega}_{Z1}$ | pitch angle velocity increment |
| $\phi$ | pitch angle | $\dot{\phi}$ | pitch angle increment |
| $\psi$ | yaw angle | $\dot{\psi}$ | yaw angle increment |
| $\gamma$ | roll angle | $\dot{\gamma}$ | roll angle increment |
| X | X-axis coordinate | $\dot{X}$ | X increment |
| Y | Y-axis coordinate | $\dot{Y}$ | Y increment |
| Z | Z-axis coordinate | $\dot{Z}$ | Z increment | wherein, m is the mass of the bomb body, g is acceleration of gravity, q is dynamic pressure, $C_A$ is axial force coefficient, $S_M$ is fire extinguishing bomb reference area, $C_N$ is normal force coefficient, $\phi'$ is synthetic attack angle, $J_{Y1}$ is rotary inertia around bomb body Y-axis, $J_{Z1}$ is rotary inertia around bomb body Z-axis, $C_{ZY1}=C_{ZZ1}$ is damping moment coefficient, l is reference length of fire extinguishing bomb, and $\Delta l$ is length from the fire extinguishing bomb barycenter to the pressure center;

above-mentioned equations are combined and solved by using the quadravalence Runge-Kutta numerical solution of ordinary differential equation (ODE), overall trajectory parameters u(t), v(t), w(t), $\omega_{Y1}$(t), $\omega_{Z1}$(t), X(t), Y(t), Z(t), $\phi$(t), $\psi$(t), $\gamma$(t) are obtained by calculating, wherein, t is the discretized time.

8. The fire fighting truck applicable to high-rise and super high-rise building fire suppression of claim 7, wherein, the height h0 of the target fire source relative to the fire extinguishing bomb and the horizontal distance d from the target to the launching point are solved and obtained from the oblique line distance L of the target and the pitching angle θ of the target relative to the turret, according to the following formula:

$$h0=L\times\sin\theta$$

$$d=L\times\cos\theta$$

after calculating the overall trajectory parameters under a certain trajectory pitching angle $\phi$, the range height H reaching the horizontal distance d is calculated at the certain trajectory pitching angle $\phi$, wherein the initial value $\phi 0=\theta$, shown as follows:

$$|H_k-h0|\leq 0.01 \quad (12)$$

$$\phi_{k+1}=\phi_k+0.5(H_k-h0)\theta \quad (13)$$

the relationship of size of H and the target height h0 is determined by using formula (12); stop the iteration if it meets formula (12), and current pitching angle $\phi_k$ is the final fire extinguishing bomb launching pitch angle; if it does not meet formula (12), formula (13) is used to upgrade the launching pitching angle, the overall trajectory parameters and range height $H_{k+1}$ are recalculated with the dynamics and kinematics differential equations, wherein k is current iteration step number, until the range height and target height h0 meets formula (12), the pitching angle $\phi_k$ by then is the final fire extinguishing bomb launching pitching angle.

9. The fire fighting truck applicable to high-rise and super high-rise building fire suppression of claim 1, wherein, the fire distinguishing bomb (7) comprises a shell (7-4), a fuze (7-6), an igniter (7-3), a fire extinguishing agent (7-9), a main charge (7-10), a empennage braking section (7-1), a combustion chamber (7-8), a blocking plate (7-2), a piston (7-7), and a fairing (7-5);

the shell (7-4), the empennage braking section (7-1) and the piston (7-7) are made of light metal materials; the shell (7-4) is cylindrical; the empennage braking section (7-1) is arranged at bottom of the shell (7-4) and is fixed with screw nails of the shell (7-4); the blocking plate (7-2) is arranged above the empennage braking section (7-1); the combustion chamber (7-8) is arranged above the blocking plate (7-2) and fixed with a screw thread of the blocking plate (7-2); the combustion chamber (7-8) is fixed with screw nails of the shell (7-4); the piston (7-7) is arranged on the combustion chamber (7-8); the inner diameter of the piston (7-7) mates with the outer diameter of the shell (7-4); the piston (7-7) has a through hole at the center; the igniter (7-3) is arranged within the through hole of the piston (7-7) and fixed with screw nails of the combustion chamber (7-8); the main charge (7-10) is arranged within the combustion chamber (7-8); the fire extinguishing agent (7-9) is arranged within the cavity on the upper portion of the piston (7-7) and fills up the entire cavity; the fairing (7-5) is arranged at the top of the shell (7-4) and fixed with dowels of the shell (7-4); the fairing (7-5) has spraying holes on the surface; and the fuze (7-6) is arranged on the fairing (7-5) and fixed through the screw nail;

during operation of the fire extinguishing bomb (7), when the fuze (7-6) detects the fire extinguishing bomb to be 5-10 meters far away from a fire source, it sends an ignition signal to the igniter (7-3), the igniter (7-3)

ignites the main charge (7-10) within the combustion chamber (7-8), the main charge (7-10) generates high pressure when combusting, the piston (7-7) is pushed under high pressure to move in the shell (7-4), the extrusion to the fire extinguishing agent (7-9) causes a pin connected between the fairing (7-5) and the shell (7-4) to be sheared, the fire extinguishing agent (7-9) continues to push the fairing (7-5) to move forward, the fairing (7-5) is braked when reaching the front end of the shell (7-4), at that time the spraying holes has already been exposed to the air, while then the piston (7-7) continues to push the fire extinguishing agent (7-9) to move forward, the fire extinguishing agent (7-9) is sprayed out from the spraying holes to attack the fir source for fire extinguishing; during the flying-spray process of the fire extinguishing bomb (7), the empennage braking section (7-1) opens a parachute to make the fire extinguishing bomb (7) to decelerate, the fire extinguishing bomb (7) penetrates the glass curtain wall, and goes deep into the building to implement fire extinguishing.

10. The fire fighting truck applicable to high-rise and super high-rise building fire suppression of claim 1, wherein, the launch control equipment (3) comprises a launch control execution assembly (3-1) and a fire extinguishing bomb simulator (3-2); wherein, the launch control execution assembly (3-1) sends a control instructions to the launching apparatus (5), the launching apparatus (5) receives the instructions from the information processing machine, and accomplishes the launch control task of the fire extinguishing bomb, the fire extinguishing bomb simulator (3-2) is used for simulating on-site signals and off-frame launching signals of the fire extinguishing bomb in the extinguishing vehicle training stage;

wherein, the inner part of the equipment compartment (4) comprises a generating set (4-1), a power supply and distribution cabinet (4-2), and a servo control device (4-3), and a communication antenna is provided outside the equipment compartment (4);

wherein, launching apparatus (5) consists of a launching turret (5-1), a launching bracket (5-2), and a module assembling frame (5-3), and the cable is provided at the structure interior center of the launching turret (5-1);

the launching bracket (5-2) used for supporting the module assembling frame plays a role in rapid loading the module assembling frame (5-3) and in orienting during launching, and the launching bracket (5-2) not only realizes the locking and unlocking of the module assembling frame (5-3), but also determines the initial launching direction by cooperating with the support foot on the module assembling frame (5-3);

wherein, the ejection device (6) mainly comprises an ejection cylinder, a power plant, and a balanced body, and the fire extinguishing bomb, the power plant and the balanced body are placed inside the ejection cylinder.

* * * * *